(12) United States Patent
Moulaire et al.

(10) Patent No.: US 11,565,743 B2
(45) Date of Patent: Jan. 31, 2023

(54) DIFFERENTIATION OF A RESISTING TORQUE ACCORDING TO DIRECTION OF MOVEMENT OF A STEERING RACK FOR IMPROVING FEEL OF DRIVER AT THE APPROACH TO AN END-OF-TRAVEL VIRTUAL STOP

(71) Applicant: JTEKT EUROPE, Irigny (FR)

(72) Inventors: Pascal Moulaire, La Tour de Salvagny (FR); Arnaud Thiery, Brignais (FR); Dimitri Barthes, Lyons (FR); Nicolas Baudouin, Lyons (FR)

(73) Assignee: JTEKT EUROPE, Irigny (FR)

( * ) Notice: Subject to any disclaimer, the term of this patent is extended or adjusted under 35 U.S.C. 154(b) by 190 days.

(21) Appl. No.: 17/048,406

(22) PCT Filed: Apr. 10, 2019

(86) PCT No.: PCT/FR2019/050843
§ 371 (c)(1),
(2) Date: Oct. 16, 2020

(87) PCT Pub. No.: WO2019/202237
PCT Pub. Date: Oct. 24, 2019

(65) Prior Publication Data
US 2021/0086825 A1   Mar. 25, 2021

(30) Foreign Application Priority Data

Apr. 16, 2018 (FR) ...................... 18/53282

(51) Int. Cl.
*B62D 5/04* (2006.01)
*B62D 6/00* (2006.01)

(52) U.S. Cl.
CPC ......... *B62D 5/0463* (2013.01); *B62D 5/0469* (2013.01); *B62D 6/008* (2013.01)

(58) Field of Classification Search
CPC ..... B62D 5/0463; B62D 5/0469; B62D 6/008
(Continued)

(56) References Cited

U.S. PATENT DOCUMENTS

2016/0221601 A1 * 8/2016 Barthomeuf ............ B60R 25/02

FOREIGN PATENT DOCUMENTS

| DE | 10 2015 102 630 A1 | 8/2015 |
|---|---|---|
| JP | 2005-82119 A | 3/2005 |
| JP | 2016-112954 A | 6/2016 |

OTHER PUBLICATIONS

Aug. 6, 2019 International Search Report issued in International Patent Application No. PCT/FR2019/050843.

* cited by examiner

*Primary Examiner* — Scott A Reinbold
(74) *Attorney, Agent, or Firm* — Oliff PLC

(57) ABSTRACT

A method for managing a power steering system assist motor, includes defining, over the functional length of the actuator member, at least one reduced assist area separate from a normal assist area by an end-of-travel virtual threshold, a step of assessing an instantaneous position and a direction of the movement of the actuator member on the functional length, a step of applying an input resistance set point value to the assist motor when the actuator member crosses the end-of-travel virtual threshold in such a way as to move from the normal assist area into the reduced assist area. After the step of applying an input resistance set point value, an output resistance set point value is applied when the actuator member is in the reduced assist area and the direction of the movement of the actuator member is directed from the reduced assist area towards the normal assist area.

8 Claims, 2 Drawing Sheets

(58) Field of Classification Search
USPC .......................................................... 701/41
See application file for complete search history.

DIFFERENTIATION OF A RESISTING TORQUE ACCORDING TO DIRECTION OF MOVEMENT OF A STEERING RACK FOR IMPROVING FEEL OF DRIVER AT THE APPROACH TO AN END-OF-TRAVEL VIRTUAL STOP

The invention concerns the field of power steering systems of a vehicle and more particularly a method for managing an assist motor of the power steering system of the vehicle.

A steering system of a vehicle serves to enable a driver to control a trajectory of the vehicle by exerting a force on a steering member, corresponding in general to a steering wheel.

Conventionally, a steering system comprises several elements including said steering member linked to a steering column, an actuator member such as a rack, and at least one steered member, such as a wheel, linked to a tie rod. The actuator member is the part allowing linking the steering member, via the steering column, to the steered member, via the tie rod; in other words the rack transforms forces exerted by the driver on the steering member into a steering of the steered member.

A power steering system of the vehicle involves an assist motor, piloted by an assist setpoint emitted by a steering calculator, to reduce the forces to be supplied by the driver on the steering member in order to steer the at least one steered member of the vehicle. Depending on the forces exerted on the steering member, that is to say a steering force, the assist motor exerts an assist force, that is to say a motor force, on the rack so as to steer the steered member.

The actuator member is movable in translation over a functional length corresponding to a maximum displacement defined between a right-side maximum position and a left-side maximum position. The functional length may be limited physically by a mechanical stop or virtually by an end-of-travel virtual setpoint as described by the patent EP3003823 in the name of the Applicant.

The end-of-travel virtual threshold determines a slowdown threshold, comprised on the functional length, beyond which the assist setpoint is modified so as to become a resistance set point value intended to resist the progress of the actuator member in the crossing direction. Hence, a normal assist area and at least one reduced assist area, over which the resistance set point value is applied to the assist motor, are determined over the functional length.

It is known to apply a resistance set point value obtained by an expression comprising an elastic component, simulating a spring effect, and/or a viscous component, simulating a damper effect, and/or an inertial component, simulating a movable mass effect. The elastic component, the viscous component and the inertial component are respectively proportional to a stiffness coefficient, a viscosity coefficient and an inertia coefficient.

The end-of-travel virtual threshold allows using the assist motor to slow down and stop the progress of the actuator member in the direction of crossing the end-of-travel virtual threshold so as to prevent it from exceeding a defined stop threshold on the functional length.

The advantages provided by such an end-of-travel virtual threshold, in particular avoiding a mechanical contact between the actuator member and a mechanical stop, lead manufacturers to wish to improve a feel of the driver at the level of the steering member, when the actuator member penetrates into the reduced assist area and leaves it.

The invention aims at improving the feel of the driver in the reduced assist area by differentiating the resistance set point value between an input resistance set point value in the reduced assist area and an output resistance set point value of the reduced assist area.

An object of the invention is a method for managing an assist motor of a power steering system of a vehicle comprising an actuator member performing a movement along a functional length, said method comprising:
 a step of defining, over the functional length of the actuator member, at least one reduced assist area separate from a normal assist area by an end-of-travel virtual threshold,
 a step of assessing an instantaneous position and a direction of the movement of the actuator member on the functional length,
 a step of applying an input resistance set point value to the assist motor when the actuator member crosses the end-of-travel virtual threshold in such a way as to move from the normal assist area into the reduced assist area,
 characterized in that, after the step of applying an input resistance set point value, an output resistance set point value is applied when the actuator member is in the reduced assist area and the direction of the movement of the actuator member is directed from the reduced assist area towards the normal assist area.

The power steering system comprises a steering member linked to a steering column, the actuator member, and at least one steered member, linked to a tie rod. The actuator member is the part allowing linking the steering member, via the steering column, to the steered member, via the tie rod.

The power steering system of the vehicle involves the assist motor to reduce forces to be supplied by a driver on the steering member in order to steer the steered member of the vehicle. Depending on the forces exerted on the steering member, that is to say the steering force, the assist motor exerts an assist force, on the actuator member so as to steer the steered member.

In the power steering system, the actuator member performs a translational movement along the functional length. Conventionally, the actuator member is a rack and the functional length is the steering casing.

The step of defining at least one reduced assist area separate from a normal assist area by an end-of-travel virtual threshold allows delimiting at least one first extent of the functional length and one second extent over which the setpoint of the assist force to be supplied by the assist motor is differentiated.

Over the normal assist area, the setpoint of the assist force is determined, in a manner known to those skilled in the art, by assist laws dependent in particular of data of the vehicle and of data of the power steering system.

Over the reduced assist area, the setpoint of the assist force is determined so as to slow down and stop the progress of the actuator member in the direction of crossing the end-of-travel virtual threshold.

Preferably, the normal assist area is positioned substantially at the middle of the functional length.

Preferably, a reduced assist area is positioned substantially at one end of the functional length.

According to one embodiment, the functional length comprises two reduced assist areas positioned symmetrically on either side of a central position of the functional length, said central position corresponding to the position for which the steered members are aligned with an axis of elongation of the vehicle.

The step of assessing an instantaneous position and a direction of the movement of the actuator member on the functional length determines characteristics of the translational movement of the actuator member.

More particularly, the instantaneous position may be indifferently defined by any representative parameter of the position of the actuator member with respect to the functional length, for example by any measurement or assessment of the absolute angular position of the steering member, the absolute angular position of the steering column, or the absolute angular position of the shaft of the assist motor.

Furthermore, the movement of the actuator member being performed along an axis of elongation of the functional length, the direction of the movement is performed in a first direction along the axis of elongation of the functional length or in the opposite direction.

A movement of the actuator member directed from the normal assist area towards the reduced assist area, when the actuator member is positioned in the reduced assist area, will be called an entry movement later on.

A movement of the actuator member directed from the reduced assist area towards the normal assist area, when the actuator member is positioned in the reduced assist area, will be called an exit movement later on.

The step of applying an input resistance set point value consists in applying to the assist motor an input resistance set point value when the actuator member performs an entry movement.

The input resistance set point value is determined so that the force supplied by the assist motor resists the movement of the actuator member, said assist motor exerting an assist force directly on the actuator member or, indirectly, that is to say the motor force is applied on the steering column, for example through a worm wheel and worm screw reducer. In particular, the input resistance set point value allows slowing down the movement of the actuator member. The value of the input resistance set point value is determined so that the actuator member does not reach, at any time, a stop threshold positioned in the reduced assist area at a predetermined distance from the end-of-travel virtual threshold.

The stop threshold may be a virtual threshold or a real mechanical stop positioned, for example, at one end of the functional length. Thus, the input resistance set point value keeps mechanical contact between the actuator member and the mechanical stop.

Preferably, the input resistance set point value is determined so as to confer on a driver an accurate and intuitive feel of the predictable behavior of contact of the actuator member with a mechanical stop.

In brief, during a steering of the driver, the actuator member, initially positioned in the normal assist area, crosses the end-of-travel virtual threshold, then approaches in a slowed down manner the stop threshold, until completely stopping its movement in the direction of the stop threshold. That is to say when the actuator member performs a movement in the direction of the reduced assist area, it crosses the end-of-travel virtual threshold then stops its movement so that it never comes into contact with the stop threshold.

The step of applying an output resistance set point value consists in applying to the assist motor an output resistance set point value when the actuator member performs an exit movement.

The actuator member, after having performed an entry movement, resumes its movement in a direction opposite to the previous direction, that is to say it performs an exit movement.

The output resistance set point value has a value different from the input resistance set point value. The output resistance set point value is determined so that the force supplied by the assist motor confers on the driver an accurate and intuitive feel of the predictable behavior that the actuator member would have after contact with a mechanical stop.

Preferably, the input resistance set point value and the output resistance set point value are parameterized so that the driver has an accurate and intuitive feel of the predictable behavior of the actuator member during a contact with a mechanical damper with a compression/expansion variable dampening.

An implementation of the invention is carried out through a programming of a calculator piloting the assist motor. Thus, it is possible to apply the invention, for example as an add-on, to most power steering devices of vehicles already circulating.

According to a feature of the invention, the output resistance set point value comprises:
  an exit elastic component, proportional to an exit stiffness coefficient and to an amplitude of the movement of the actuator member,
  and an exit viscous component, proportional to an exit viscosity coefficient and to a velocity of the movement of the actuator member.

The exit elastic component allows simulating a spring effect. The exit elastic component is proportional to the predetermined exit stiffness coefficient, corresponding to the stiffness of a spring, and to an amplitude of the movement of the actuator member in the reduced assist area. The movement of the actuator member is a translation along the axis represented by the functional length.

The exit elastic component allows ensuring the continuity of the feel of the driver between the entry and exit movements. However, it could cause a strong bouncing effect by restituting energy to the actuator member.

The exit viscous component allows simulating a damper effect. The exit viscous component is proportional to the predetermined exit viscosity coefficient, and to the velocity of the movement of the actuator member in the reduced assist area. The velocity of the movement of the actuator member is a linear velocity corresponding to the first derivative with respect to time of the instantaneous position or, in an equivalent manner, of the amplitude of the movement. For example, the velocity of the movement of the actuator member may be assessed from a measurement of the angular velocity of the steering member, or of the angular velocity of the shaft of the assist motor.

The exit viscous component allows reducing the restitution of energy to the actuator member by the exit elastic component. That is to say the viscous component limits the bouncing effect caused by the exit elastic component.

The output resistance set point value is thus obtained by a first-order expression simulating effects on the actuator member following a spring-damper type abutment, known to those skilled in the art. The first-order expression corresponds to a reaction of the actuator member after having come into contact with a stop virtual mechanism comprising a spring mounted in parallel with a viscosity linear damper.

According to a feature of the invention, the output resistance set point value comprises:
  an exit elastic component, proportional to an exit stiffness coefficient and to an amplitude of the movement of the actuator member,
  an exit viscous component, proportional to an exit viscosity coefficient and to a velocity of the movement of the actuator member, and an exit inertial component, proportional to an exit inertia coefficient and to the acceleration of the movement of the actuator member.

The exit inertial component allows simulating a movable mass effect. The exit inertial component is proportional to the predetermined exit inertia coefficient, and to the acceleration of the movement of the actuator member in the reduced assist area. The acceleration of the movement of the actuator member is a linear acceleration corresponding to the second derivative with respect to time of the instantaneous position or, in an equivalent manner, of the amplitude of the movement. For example, the acceleration of the movement of the actuator member may be assessed from a calculation of velocity derivative, or of successive derivatives of the position of the actuator member, or else from the angular acceleration of the steering member or of the shaft of the assist motor.

The exit inertial component allows simulating the inertia of the actuator member after contact with a mechanical stop.

The output resistance set point value is thus obtained by a second-order expression simulating effects on the actuator member following a mass-spring-damper type abutment, known to those skilled in the art. The second-order expression allows obtaining a more accurate perception of the effects on the actuator member after contact with a mechanical stop, ensuring a better feel of driving, more natural and more intuitive for the driver.

According to a feature of the invention, the exit stiffness coefficient and/or the exit viscosity coefficient and/or the exit inertia coefficient are dependent of at least one parameter amongst: a velocity of displacement of the vehicle on which the assist motor is installed, a torque exerted by a driver on a steering member, the instantaneous position of the actuator member, the amplitude of the movement of the actuator member, the velocity of the movement of the actuator member, the acceleration of the movement of the actuator member.

Thus, the exit stiffness coefficient and/or the exit viscosity coefficient and/or the exit inertia coefficient are adapted according to a service life situation of the vehicle. The exit stiffness coefficient and/or the exit viscosity coefficient and/or the exit inertia coefficient are determined from predetermined charts or curves as a function of the different parameters.

According to a feature of the invention, the input resistance set point value comprises:
an entry elastic component proportional to an entry stiffness coefficient and to the amplitude of the movement of the actuator member,
and an entry viscous component proportional to an entry viscosity coefficient and to the velocity of the movement of the actuator member.

The entry elastic component allows simulating a spring effect. The entry elastic component is proportional to the predetermined entry stiffness coefficient, corresponding to the stiffness of a spring, and to an amplitude of the movement of the actuator member in the reduced assist area.

The entry elastic component generates an elastic biasing load which opposes an increasing resistance to the push-in of the actuator member, which resistance is proportional to the movement of the actuator member beyond the considered end-of-travel virtual threshold.

The entry viscous component allows simulating a damper effect. The entry viscous component is proportional to the predetermined entry viscosity coefficient, and to the velocity of the movement of the actuator member in the reduced assist area.

The entry viscous component allows moderating the velocity of displacement of the actuator member so as not to reach the stop threshold at an excessively high velocity that would result in creating a quick increase in the steering force felt by the driver as abnormal.

The input resistance set point value is thus obtained by a first-order expression simulating a spring-damper stop, known to those skilled in the art.

According to a feature of the invention, the input resistance set point value comprises:
an entry elastic component proportional to an entry stiffness coefficient and to the amplitude of the movement of the actuator member,
an entry viscous component proportional to an entry viscosity coefficient and to the velocity of the movement of the actuator member,
and an entry inertial component proportional to an entry inertia coefficient and to the acceleration of the movement of the actuator member.

The entry inertial component allows simulating a movable mass effect. The entry inertial component is proportional to the predetermined entry inertia coefficient, and to the acceleration of the movement of the actuator member in the reduced assist area.

The entry inertial component allows simulating the inertia of the actuator member coming into contact with a mechanical stop.

The input resistance set point value is thus obtained by a second-order expression simulating a mass-spring-damper stop, known to those skilled in the art. The second-order expression allows obtaining a more accurate perception of an abutment with a mechanical stop, ensuring a better feel of driving, more natural and more intuitive for the driver.

According to a feature of the invention, the entry stiffness coefficient and/or the entry viscosity coefficient and/or the entry inertia coefficient are dependent of at least one parameter amongst: the velocity of displacement of a vehicle on which the assist motor is installed, a torque exerted by a driver on a steering member, the instantaneous position of the actuator member, the amplitude of the movement of the actuator member, the velocity of the movement of the actuator member, the acceleration of the movement of the actuator member.

Thus, the entry stiffness coefficient and/or the entry viscosity coefficient and/or the entry inertia coefficient are adapted according to a service life situation of the vehicle. The entry stiffness coefficient and/or the entry viscosity coefficient and/or the entry inertia coefficient are determined from predetermined charts or curves as a function of the different parameters.

According to a feature of the invention, the at least one end-of-travel virtual threshold is dependent of at least one parameter amongst: the velocity of displacement of a vehicle on which the assist motor is installed, a torque exerted by a driver on a steering member, the instantaneous position of the actuator member, the amplitude of the movement of the actuator member, the velocity of the movement of the actuator member, the acceleration of the movement of the actuator member.

Thus, it is possible to adapt, according to the service life situation of the vehicle, the strategy, that is to say the position, of implementation of the end-of-travel virtual threshold, and in particular the conditions of activation of said end-of-travel virtual threshold.

According to a feature of the invention, the entry viscosity coefficient has a higher value than the exit viscosity coefficient.

Thus, the entry viscosity coefficient has a high value, allowing reducing the velocity of the actuator member.

According to a feature of the invention, the entry viscosity coefficient applies earlier with regards to the entry stiffness coefficient.

The exit viscosity coefficient has a low value, and more particularly lower than the value of the entry viscosity coefficient, in order not to excessively resist the exit movement.

According to a feature of the invention, the exit viscosity coefficient applies when the exit stiffness coefficient applies.

According to a feature of the invention, the exit viscosity coefficient is not zero.

The invention will be better understood, thanks to the description hereinafter, which relates to an embodiment according to the present invention, provided as a non-limiting example and explained with reference to the appended schematic drawings, in which.

Figure 3:
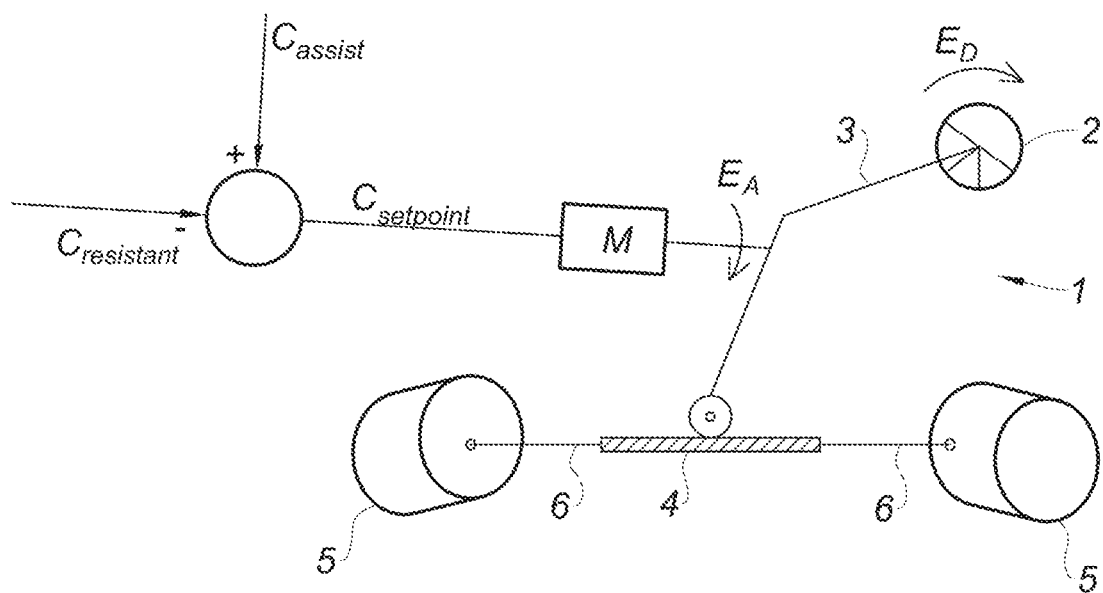
FIG. 3 illustrates, according to a block diagram, a power steering system of a vehicle.

A power steering system 1 according to the invention, and as illustrated in FIG. 3, comprises a steering member, that is to say a steering wheel 2, linked to a steering column 3, an actuator member, that is to say a rack 4, and two steered members, that is to say two wheels 5, each linked to a tie rod 6. The rack 4 is the part allowing linking the steering wheel 2, via the steering column 3, to the wheels 5, via the tie rods 6.

The power steering system 1 of the vehicle involves an assist motor M, which receives a setpoint $C_{setpoint}$ determining an assist force EA to be applied to the rack to reduce forces that are to be supplied by a driver, that is to say a steering force $E_D$, on the steering wheel 2 in order to steer the wheels 5 of the vehicle. Depending on the exerted steering force $E_D$, the assist motor M exerts an assist force $E_A$, on the rack 4 so as to steer the wheels 5.

Figure 2:
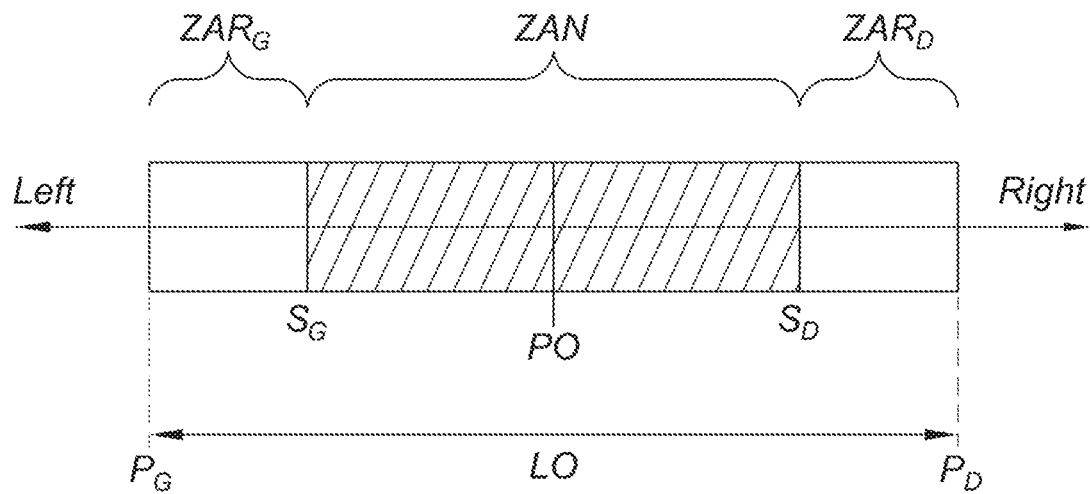
FIG. 2 illustrates, according to a schematic view, a positioning of the end-of-travel virtual thresholds and of stop thresholds on a functional length according to the invention.

An object of the invention is a method for managing the assist motor M of the power steering system 1 comprising a rack 4 performing a translational movement along a functional length L0, that is to say the steering casing L0, as illustrated in FIG. 2.

The method comprises a step of defining, over the functional length L0 of the actuator member, at least one reduced assist area $ZAR_D$, $ZAR_G$ separate from a normal assist area ZAN by an end-of-travel virtual threshold $S_G$, $S_D$.

Thus, the functional length L0, comprising a right-side end $P_D$ and a left-side end $P_G$, is virtually separated into a normal assist area ZAN and into two reduced assist areas $ZAR_D$, $ZAR_G$.

The right-side $P_D$, respectively left-side $P_G$, end corresponds to a position of the rack 4 in which the rack 4 can no longer, functionally by mere mechanical construction, be steered further to the right, respectively to the left.

Over the normal assist area ZAN, positioned substantially at the middle of the functional length L0, the setpoint $C_{setpoint}$ of the assist motor M is equal to an assist torque $C_{assist}$ determined by assist laws dependent in particular of data of the vehicle and of data of the power steering system 1.

Over the reduced assist area $ZAR_D$, $ZAR_G$, positioned at each end $P_D$, $P_G$, of the functional length L0, and symmetrically on either side of a central position PO of the functional length L0, the setpoint $C_{setpoint}$ of the assist motor M is equal to an assist torque $C_{assist}$ reduced by a determined resistance torque $C_{resistant}$ to slow down and stop the progress of the rack 4 in the direction of crossing the end-of-travel virtual threshold $S_G$, $S_D$.

The central position PO is the position of the rack 4 for which the steering angle of the wheels 5 is zero, that is to say the wheels are straight, or aligned in the front-rear longitudinal axis of the vehicle.

More specifically, the left-side reduced assist area $ZAR_G$ is positioned at the left-side end $P_G$ of the functional length L0 separate from the normal assist area ZAN by the left-side end-of-travel virtual stop threshold $S_G$.

The right-side reduced assist area $ZAR_D$ is positioned at the right-side end $P_D$ of the functional length L0 separate from the normal assist area ZAN by the right-side end-of-travel virtual stop threshold $S_G$.

The end-of-travel virtual thresholds $S_D$, $S_G$ are dependent of a velocity of displacement of the vehicle, the steering force $E_D$, the amplitude of the movement $X_{Rack}$ of the rack 4, the velocity of the movement $\dot{X}_{Rack}$ of the rack 4, the acceleration of the movement $\ddot{X}_{Rack}$ of the rack 4.

The method also comprises a step of assessing an instantaneous position and a direction D of the movement of the actuator member on the functional length L0.

The movement of the rack 4 being performed along an axis of elongation of the functional length L0, the direction D of the movement is performed in a first direction, along the axis of elongation of the functional length L0 or in the opposite direction. Next, reference will be made to the right-side direction as corresponding to the direction of a movement allowing getting from the left-side reduced assist area $ZAR_G$ towards the normal assist area ZAN or from the normal assist area ZAN towards the right-side reduced assist area $ZAR_D$. Reference will also be mode to the left-side direction as corresponding to the direction of a movement allowing getting from the right-side reduced assist area $ZAR_D$ towards the normal assist area ZAN or from the normal assist area ZAN towards the left-side reduced assist area $ZAR_G$.

Thus, a movement of the rack 4 to the left, when the rack is positioned in the left-side reduced assist area $ZAR_G$, and to the right when the rack is positioned in the right-side reduced assist area $ZAR_D$ will be called an entry movement later on.

Finally, a movement of the rack 4 to the right, when the rack is positioned in the left-side reduced assist area $ZAR_G$, and to the left when the rack is positioned in the right-side reduced assist area $ZAR_D$ will be called an exit movement later on.

The right-side $ZAR_D$ and left-side $ZAR_G$ reduced assist areas having a symmetrical behavior, we will refer only to the right-side reduced assist area $ZAR_D$ in the following description.

The method according to the invention comprises a step of applying an input resistance set point value $C_{resistant}$ to the assist motor M when the actuator member crosses the end-of-travel virtual threshold $S_G$, $S_D$ in such a way as to move from the normal assist area ZAN into the reduced assist area $ZAR_D$, $ZAR_G$.

The input resistance set point value $C_{resistant}$ is determined so that the assist force $E_A$ supplied by the assist motor M resists the movement of the rack 4. In particular, the input resistance set point value $C_{resistant}$ allows slowing down the movement of the rack 4 so that the rack 4 does not reach at any time a right-side stop threshold corresponding to the right-side end PD or a left-side stop threshold corresponding to the left-side end PG.

When the rack is in the reduced assist area $ZAR_D$, $ZAR_G$, the setpoint $C_{setpoint}$ of the assist motor M is equal to the assist torque $C_{assist}$ reduced by the resistance set point value $C_{resistant}$ as illustrated in FIG. 3.

Figure 1:
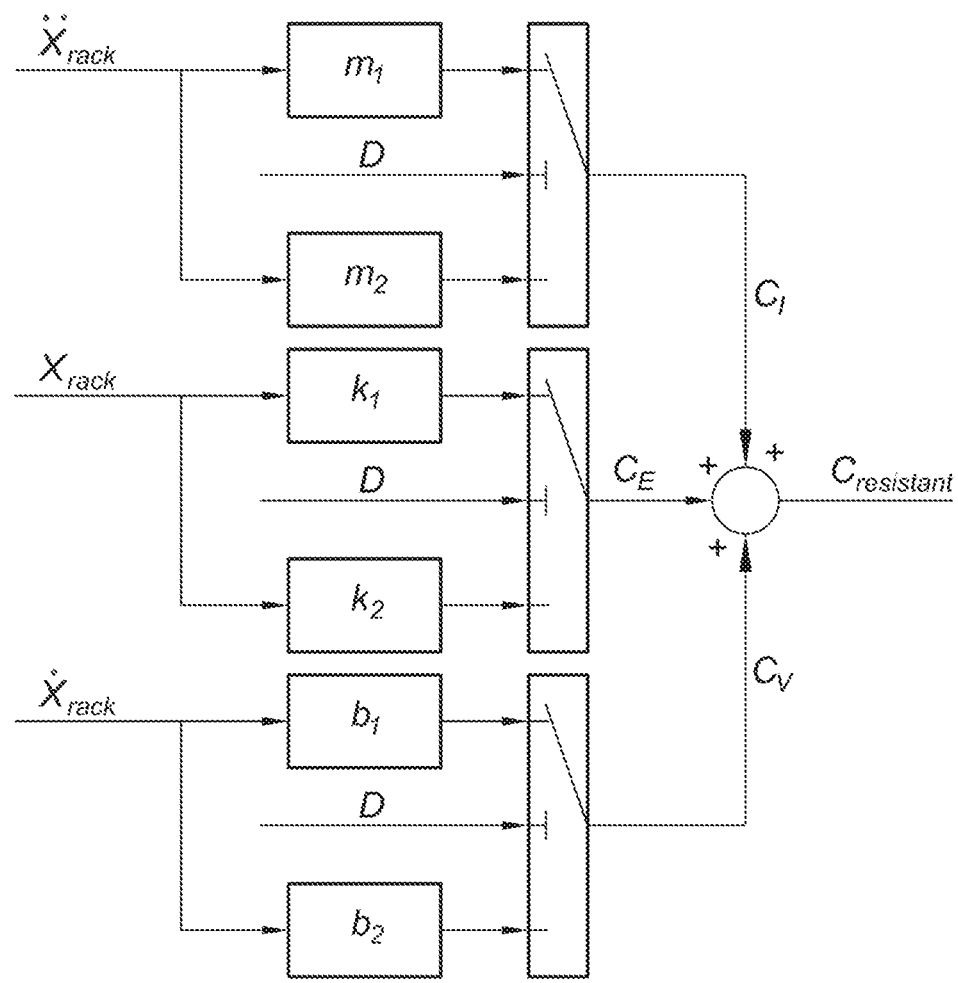
FIG. 1 illustrates, according to a block diagram, an implementation of a calculation of a resistant torque according to the invention.

As illustrated in FIG. 1, the input resistance set point value $C_{resistant}$ is the sum of:
- an entry elastic component $C_E$ proportional to an entry stiffness coefficient $k_1$ and to the amplitude of the movement $X_{Rack}$ of the rack 4,
- an entry viscous component $C_V$ proportional to an entry viscosity coefficient $b_1$ and to the velocity of the movement $\dot{X}_{Rack}$ of the rack 4,
- and an entry inertial component $C_I$ proportional to an entry inertia coefficient $m_1$ and to the acceleration of the movement $\ddot{X}_{Rack}$ of the rack 4.

The input resistance set point value $C_{resistant}$ is thus obtained by a second-order expression simulating a mass-spring-damper stop, known to those skilled in the art. The second-order expression allows obtaining a more accurate perception of an abutment with a mechanical stop, ensuring a better feel of driving, more natural and more intuitive for the driver.

The entry stiffness coefficient $k_1$, the entry viscosity coefficient $b_1$ and the entry inertia coefficient $m_1$ are dependent of the velocity of displacement of the vehicle, the steering force $E_D$, the amplitude of the movement $X_{Rack}$ of the rack 4, the velocity of the movement $\dot{X}_{Rack}$ of the rack 4, the acceleration of the movement $\ddot{X}_{Rack}$ of the rack 4. The entry stiffness coefficient $k_1$ and the entry viscosity coefficient $b_1$ and the entry inertia coefficient $m_1$ are determined from predetermined charts as a function of the different parameters.

The method comprises a step of applying an output resistance set point value $C_{resistant}$ when the actuator member is in the reduced assist area $ZAR_D$, $ZAR_G$ and the direction D of the movement of the actuator member is directed from the reduced assist area $ZAR_D$, $ZAR_G$ towards the normal assist area ZAN.

The step of applying an output resistance set point value $C_{resistant}$ consists in applying to the assist motor M an output resistance set point value $C_{resistant}$ when the rack 4 performs an exit movement.

The output resistance set point value $C_{resistant}$ has a value different from the input resistance set point value $C_{resistant}$.

As illustrated in FIG. 1, the output resistance set point value is the sum of:
- an exit elastic component $C_E$, proportional to an exit stiffness coefficient $k_2$ and to an amplitude $X_{Rack}$ of the movement of the rack 4,
- an exit viscous component $C_V$, proportional to an exit viscosity coefficient $b_2$ and to a velocity of the movement $\dot{X}_{Rack}$ of the rack 4,
- and an exit inertial component $C_I$, proportional to an exit inertia coefficient $m_2$ and to the acceleration of the movement $\ddot{X}_{Rack}$ of the rack 4.

The output resistance set point value $C_{resistant}$ is thus obtained by a second-order expression simulating effects on the rack following a mass-spring-damper type abutment, known to those skilled in the art. The second-order expression allows obtaining a more accurate perception of the effects on the actuator member after contact with a mechanical stop, ensuring a better feel of driving, more natural and more intuitive for the driver.

The exit stiffness coefficient $k_2$, the exit viscosity coefficient $b_2$ and the exit inertia coefficient $m_2$ are dependent of the velocity of displacement of the vehicle, the steering force $E_D$, the amplitude of the movement $X_{Rack}$ of the rack 4, the velocity of the movement $\dot{X}_{Rack}$ of the rack 4, and the acceleration of the movement $\ddot{X}_{Rack}$ of the rack 4.

The exit stiffness coefficient $k_2$, the exit viscosity coefficient $b_2$ and the exit inertia coefficient $m_2$ are determined from predetermined charts as a function of the different parameters.

When the rack 4 is positioned in the normal assist area ZAN, the assist motor M receives a setpoint $C_{setpoint}$ equal to the assist torque $C_{assist}$. Then, during a steering to the right by the driver, that is to say when the driver exerts a steering force $E_D$ to the right, the rack 4 performs a movement to the right, then crosses the right-side end-of-travel virtual threshold $S_D$. The rack 4 is thus in the right-side reduced assist area $ZAR_D$, it performs an entry movement. The assist motor M then receives a setpoint $C_{setpoint}$ equal to the assist motor $C_{assist}$ less the input resistance set point value $C_{resistant}$. In this manner, the rack 4 approaches the right-side stop threshold $P_D$ in a slowed down manner, until completely stopping its movement in the direction of the right-side stop threshold $P_D$. That is to say, when the rack performs a movement to the right, it crosses the right-side end-of-travel virtual threshold $S_D$ and then stops its movement so that it never comes into contact with the right-side stop threshold $P_D$.

The input resistance set point value $C_{resistant}$ is determined so as to confer on a driver an accurate and intuitive feel of the predictable behavior when coming into contact with a mechanical stop that would be positioned at the right-side stop threshold $P_D$.

The rack 4 resumes its movement to the left so that it performs an exit movement. The assist motor M then receives a setpoint $C_{setpoint}$ equal to the assist torque $C_{assist}$ less the output resistance set point value $C_{resistant}$.

The output resistance set point value $C_{resistant}$ is determined so that the driver has an accurate and intuitive feel of the predictable behavior of the rack after contact with the mechanical stop.

The entry viscosity coefficient $b_1$ is strictly higher than the exit viscosity coefficient $b_2$.

In this manner, the entry viscosity coefficient $b_1$ with a high value allows reducing the velocity of the rack in order to avoid the rack 4 reaching the stop threshold at an excessively high velocity and the exit viscosity coefficient $b_2$ with a low value allows avoiding the rack being excessively braked during the exit movement.

Moreover, the entry viscosity coefficient $b_1$ applies earlier with regards to the entry stiffness coefficient $k_1$.

Furthermore, the exit viscosity coefficient $b_2$ applies when the exit stiffness coefficient $k_2$ applies.

By artificially hardening the movement of the rack 4 and/or in an equivalent manner the rotation of the steering wheel 2, only from the end-of-travel virtual thresholds $S_G$, $S_D$, it is possible to effectively protect the steering from shocks, yet without hampering driving.

Of course, the invention is not limited to the embodiments described and represented in the appended figures. Modifications are still possible, in particular with regards to the constitution of the various elements or by substitution with technical equivalents, yet without departing from the scope of the invention.

The invention claimed is:

1. A method for managing an assist motor of a power steering system of a vehicle comprising an actuator member performing a movement along a functional length, said method comprising:
    a step of defining, over the functional length of the actuator member, at least one reduced assist area separate from a normal assist area by an end-of-travel virtual threshold,
    a step of assessing an instantaneous position and a direction of the movement of the actuator member on the functional length,
    a step of applying an input resistance set point value to the assist motor when the actuator member crosses the end-of-travel virtual threshold in such a way as to move from the normal assist area into the reduced assist area,
    wherein, after the step of applying an input resistance set point value, an output resistance set point value is applied when the actuator member is in the reduced assist area and the direction of the movement of the actuator member is directed from the reduced assist area towards the normal assist area, and
    wherein the output resistance set point value comprises:
    an exit elastic component, proportional to an exit stiffness coefficient and to an amplitude of the movement of the actuator member,
    and an exit viscous component, proportional to an exit viscosity coefficient and to a velocity of the movement of the actuator member.

2. The management method according to claim 1, wherein the output resistance set point value further comprises:
    an exit inertial component, proportional to an exit inertia coefficient and to the acceleration of the movement of the actuator member.

3. The management method according to claim 1, wherein at least one of the exit stiffness coefficient, the exit viscosity coefficient, and the exit inertia coefficient is dependent of at least one parameter selected from the group consisting of a velocity of displacement of the vehicle on which the assist motor is installed, a torque exerted by a driver on a steering member, the instantaneous position of the actuator member, the amplitude of the movement of the actuator member, the velocity of the movement of the actuator member, and the acceleration of the movement of the actuator member.

4. The management method according to claim 1, wherein the input resistance set point value comprises:
    an entry elastic component proportional to an entry stiffness coefficient and to the amplitude of the movement of the actuator member,
    and an entry viscous component proportional to an entry viscosity coefficient and to the velocity of the movement of the actuator member.

5. The management method according to claim 1, wherein the input resistance set point value comprises:
    an entry elastic component proportional to an entry stiffness coefficient and to the amplitude of the movement of the actuator member,
    an entry viscous component proportional to an entry viscosity coefficient and to the velocity of the movement of the actuator member,
    and an entry inertial component proportional to an entry inertia coefficient and to the acceleration of the movement of the actuator member.

6. The management method according to claim 4, wherein at least one of the entry stiffness coefficient, the entry viscosity coefficient, and the entry inertia coefficient is dependent of at least one parameter selected from the group consisting of the velocity of displacement of a vehicle on which the assist motor is installed, a torque exerted by a driver on a steering member, the instantaneous position of the actuator member, the amplitude of the movement of the actuator member, the velocity of the movement of the actuator member, and the acceleration of the movement of the actuator member.

7. The management method according to claim 1, wherein the at least one end-of-travel virtual threshold is dependent of at least one parameter selected from the group consisting of the velocity of displacement of a vehicle on which the assist motor is installed, a torque exerted by a driver on a steering member, the instantaneous position of the actuator member, the amplitude of the movement of the actuator member, the velocity of the movement of the actuator member, and the acceleration of the movement of the actuator member.

8. The management method according to claim 1, wherein the entry viscosity coefficient has a higher value than the exit viscosity coefficient.

* * * * *